United States Patent
Sanz et al.

(10) Patent No.: US 9,492,802 B2
(45) Date of Patent: Nov. 15, 2016

(54) SYSTEM FOR DENSE LOADING OF CATALYST INTO BAYONET TUBES FOR A STEAM REFORMING EXCHANGER-REACTOR USING FLEXIBLE AND REMOVABLE SLOWING ELEMENTS

(71) Applicant: IFP Energies nouvelles, Rueil-Malmaison (FR)

(72) Inventors: Elena Sanz, Lyons (FR); Robert Beaumont, Rillieux la Pape (FR); Daniel Svezia, Feyzin (FR); Christophe Boyer, Charly (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 14/436,153

(22) PCT Filed: Sep. 24, 2013

(86) PCT No.: PCT/FR2013/052242
§ 371 (c)(1),
(2) Date: Apr. 16, 2015

(87) PCT Pub. No.: WO2014/060670
PCT Pub. Date: Apr. 24, 2014

(65) Prior Publication Data
US 2015/0283529 A1    Oct. 8, 2015

(30) Foreign Application Priority Data

Oct. 17, 2012 (FR) .................................... 12 02771

(51) Int. Cl.
*B65B 1/04*    (2006.01)
*B01J 8/00*    (2006.01)
*B01J 8/06*    (2006.01)

(52) U.S. Cl.
CPC ................. *B01J 8/003* (2013.01); *B01J 8/002* (2013.01); *B01J 8/06* (2013.01); *B01J 2208/00752* (2013.01); *B01J 2208/00778* (2013.01)

(58) Field of Classification Search
CPC . B01J 8/002; B01J 8/003; B01J 2208/00778
USPC .................... 141/364, 365; 414/287; 193/32
See application file for complete search history.

(56) References Cited

U.S. PATENT DOCUMENTS 5,247,970 A * 9/1993 Ryntveit .................. B01J 8/003
                                                      141/1
6,467,513 B1 * 10/2002 Yanaru .................... B01J 8/002
                                                      141/12

(Continued)

FOREIGN PATENT DOCUMENTS

EP    1749568 A1    2/2007
FR    2789050 A1    8/2000

(Continued)

OTHER PUBLICATIONS

International Search Report dated Jan. 20, 2014 issued in corresponding PCT/FR2013/052242 application (pp. 1-3).

(Continued)

*Primary Examiner* — Jason K Niesz
(74) *Attorney, Agent, or Firm* — Millen White Zelano and Branigan, PC; Csaba Henter; John Sopp

(57) ABSTRACT

The present invention describes a device and a method for dense and homogeneous loading of catalyst into the annular space of bayonet tubes employed in a steam reforming reactor, said device employing removable slowing elements.

9 Claims, 3 Drawing Sheets

(56) References Cited

U.S. PATENT DOCUMENTS

| | | |
|---|---|---|
| 8,025,472 B2 | 9/2011 | Fry |
| 8,578,978 B2 | 11/2013 | Sanz et al. |
| 2006/0213575 A1* | 9/2006 | McNaughton .......... B01J 8/003 141/286 |
| 2008/0298932 A1 | 12/2008 | Fry |
| 2009/0090429 A1 | 4/2009 | Cochrane et al. |
| 2009/0257849 A1 | 10/2009 | Oliveira et al. |
| 2010/0175775 A1* | 7/2010 | Richter .................. B01J 8/002 141/1 |
| 2011/0083769 A1 | 4/2011 | Sanz et al. |
| 2011/0150624 A1 | 6/2011 | Fry |
| 2011/0250102 A1* | 10/2011 | Sakai ..................... B01J 8/003 422/198 |
| 2012/0125479 A1* | 5/2012 | Brightling ............. B01J 8/003 141/2 |

FOREIGN PATENT DOCUMENTS

| | | |
|---|---|---|
| FR | 2950822 A1 | 4/2011 |
| WO | 2007/039764 A1 | 4/2007 |
| WO | 2008/151139 A1 | 12/2008 |
| WO | 2011/012875 A1 | 2/2011 |

OTHER PUBLICATIONS

English Translation Abstract of FR 2789050 A1 published Aug. 4, 2000.

English Translation Abstract of EP 1749568 A1 published Feb. 7, 2007.

* cited by examiner

SYSTEM FOR DENSE LOADING OF CATALYST INTO BAYONET TUBES FOR A STEAM REFORMING EXCHANGER-REACTOR USING FLEXIBLE AND REMOVABLE SLOWING ELEMENTS

FIELD OF THE INVENTION

The present invention relates to the field of loading catalytic tubes used in tubular reactors employing highly endothermic or highly exothermic reactions. Thus, the present invention is particularly suitable for a reactor for steam reforming natural gas or various hydrocarbon cuts with a view to producing the $CO+H_2$ mixture known as synthesis gas.

Two major families of steam reforming reactors can be distinguished:

Reactors in which the heat is supplied by a series of burners located inside the reactor, and those in which the heat is supplied via a heat transfer fluid, generally combustion fumes, said combustion taking place outside the steam reforming reactor per se.

Certain reactors of this latter type, which will hereinafter be denoted exchanger-reactors, employ simple tubes. Others use double-walled concentric tubes which are also known as bayonet tubes. A bayonet tube can be defined as an inner tube surrounded by an outer tube which is coaxial with the inner tube, the annular space between the inner tube and the outer tube generally being filled with catalyst. In the remainder of the text, the term "annular space" or "catalytic zone" will be used to designate said annular space defined by the bayonet tubes.

In the context of the present invention, natural gas, or more generally the hydrocarbon feed, is introduced via the annular zone in a top to bottom flow and the reaction effluents are collected in the central portion of the internal tube in a bottom to top flow.

The reaction for steam reforming natural gas for the production of hydrogen is highly endothermic and thus generally takes place in furnaces or in exchanger-reactors as defined above.

The reaction takes place at very high temperatures, typically 900° C., and under pressures which are typically 20 to 30 bars. Under these conditions, due to the mechanical behaviour of the materials, the reaction can only be carried out under viable economic conditions if it is inside tubes.

Catalytic exchanger-reactors are thus constituted by a multitude of tubes, typically of the order of 200 to 350 tubes for units producing 100000 $Nm^3/h$ of hydrogen, this series of tubes being enclosed in a shell which receives the hot fluid, which means that the heat necessary for the steam reforming reaction can be supplied.

This hot fluid or heat transfer fluid is generally constituted by the fumes from a combustion which has taken place outside the exchanger-reactor.

Thus, the catalyst has to be installed in all of the steam reforming tubes in a regular manner from one tube to another, in order to have an identical pressure drop from one tube to another.

This condition is very important in guaranteeing a good distribution of reagents over the series of catalytic tubes and to prevent one tube from being undersupplied, for example, which could result in major overheating of the material constituting the tube, this overheating substantially reducing the service life of the tube.

Similarly, it is important that no voids, i.e. areas without catalyst or depleted in catalyst, subsist in the tube as again, the tube could overheat locally in the absence of a catalytic reaction inside it. In addition, any heterogeneity in the distribution of the catalyst in the reaction zone could result in an unbalanced flow of reaction fluid or fluids.

Thus, the aim of the device of the invention is to allow loading which is both dense and homogeneous over each of the bayonet tubes forming part of the exchanger-reactor.

EXAMINATION OF THE PRIOR ART

In a conventional reforming furnace, the tubes, which typically have an internal diameter of 10 cm, are conventionally loaded using bags filled with catalyst which are opened over the surface of the bed. This mode of loading is known to the skilled person as "sock loading" and is known not to result in a high loading density.

The tubes are then manually vibrated by being struck with a hammer or a mechanical vibration system, to encourage the grains of catalyst to become properly positioned and minimize the voids and thus increase the loading density. However, excessive vibration might result in rupture of the catalyst grains and a substantial increase in the pressure drop.

However, with this method it is difficult to produce good quality loading and it is generally necessary to repeat the vibration operation several times in order to obtain pressure drops which are similar from one tube to another.

Other improved procedures and equipment have been proposed under the technological term Unidense™ initially developed by Norsk Hydro or under the technological term Spiraload™ developed by Haldor Topsøe. These technologies are applicable to single tubes, but not to bayonet tubes.

The Applicant's patent FR 2 950 822 describes a solution for loading bayonet tubes with 3 loading tubes, with mechanical brakes or pneumatic braking. That loading method can be used to produce dense, uniform loading of the bayonet tubes. It is a "grain by grain" method and turns out to be too slow and poorly suited for use on the scale of an industrial reactor comprising several hundred tubes.

In general, it could be said that many documents exist in the field of loading catalyst into steam reforming tubes. The majority of them use slowing means or means with obstacles of greater or lesser rigidity in the form of an inclined plane.

However, none of the documents found concerns an application to bayonet tubes when an annular zone is loaded, avoiding the central tube.

The device of the present invention can thus be defined as a device for dense loading catalyst into the annular zone of bayonet tubes provided in a steam reforming exchanger-reactor, the device being used to obtain a homogeneous loading density in each of the tubes of the exchanger-reactor within a time period which is compatible with the demands of industrial scale start-up.

In addition, in a certain number of cases, the device of the invention must be able to be adapted to variations in the internal diameter of the external tube, imposed by mechanical and thermal stresses which change along the tube, and thus change the dimensions of the annular zone. None of the prior art devices takes this supplemental constraint into account.

BRIEF DESCRIPTION OF THE INVENTION

Figure 1:
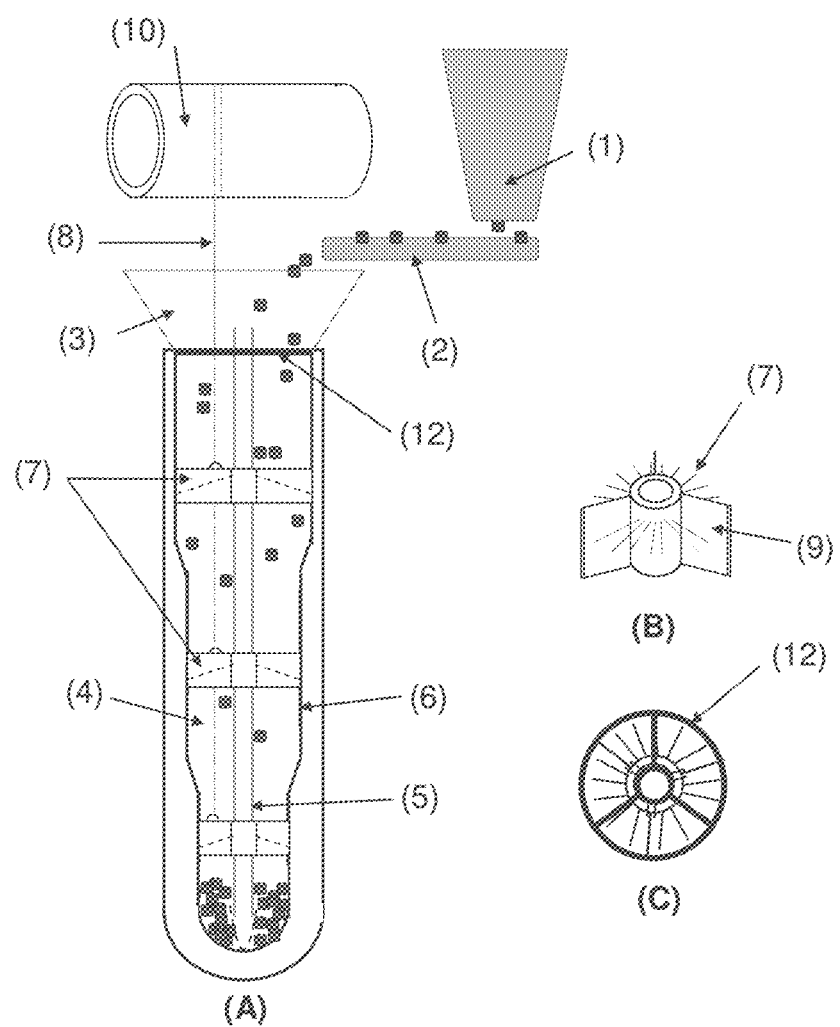
FIG. 1a represents the device of the invention in the case in which the annular zone 4 has dimensional variations linked to a change in the diameter of the external tube 6.
FIG. 1b represents a slowing element in accordance with the invention in perspective.
FIG. 1c represents the device of the invention and the centring piece 12 viewed from above.
Figure 2:
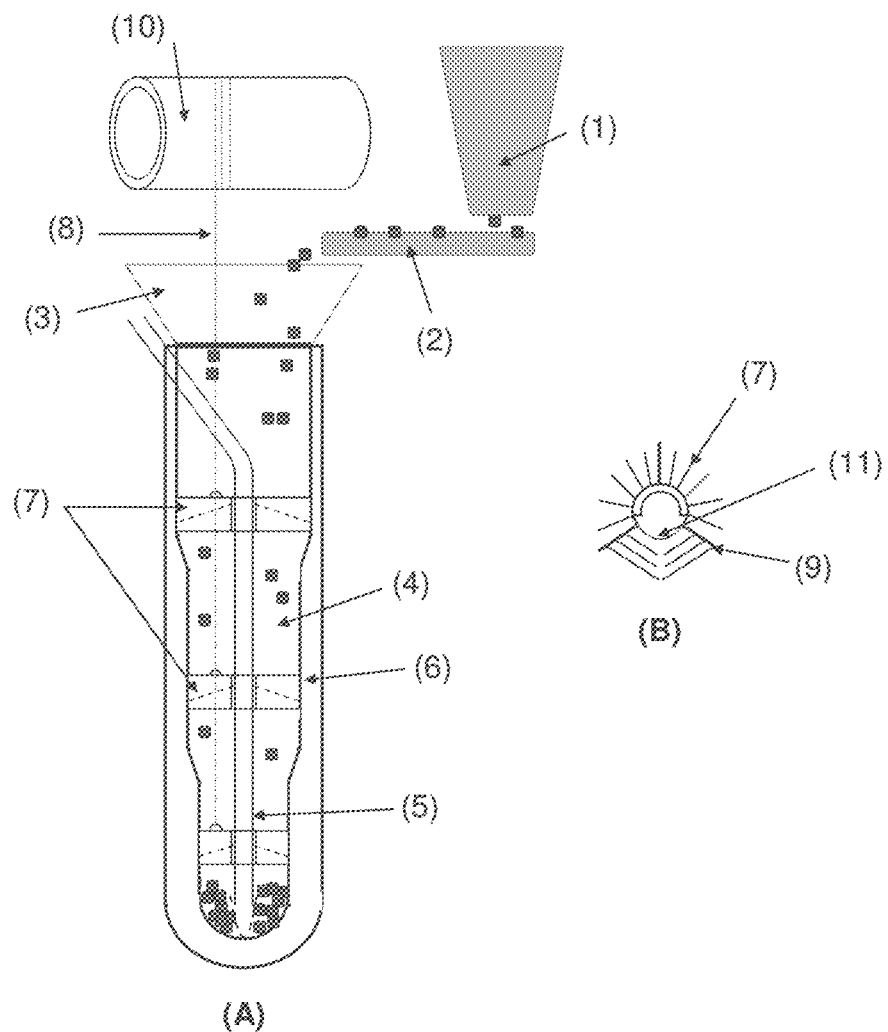
FIG. 2a represents the device of the invention in the case in which the annular zone 4 has dimensional variations and in which the internal tube 5 passed through its upper portion.
FIG. 2b represents a slowing element of the invention, viewed from above.

The present invention can be defined as a device for densely filling catalyst specially adapted to a steam reforming exchanger-reactor consisting of a plurality of bayonet tubes enclosed in a shell, each bayonet tube comprising an annular zone which is at least partially filled with catalyst. Said catalyst is constituted by solid particles occupying at least part of the annular space 4 included between an internal tube 5 and an external tube 6, the assembly of these two tubes constituting the bayonet tube, the width of said annular space being in the range 30 mm to 80 mm, and its height being in the range 10 to 20 metres.

The catalyst particles are generally in the form of cylinders with an approximate height of 10 mm to 20 mm and an approximate diameter of 5 mm to 20 mm.

In its basic version, the device of the present invention consists of:
  a series of elements 7 for slowing said solid particles down, connected together in a flexible manner by vertical wires or one or more chains 8 and extending over the whole section of the annular zone 4.

A slowing element 7 has the general form of a ring with an internal diameter substantially equal to that of the internal tube 5 and with an external diameter substantially equal to that of the internal diameter of the external tube 6. A slowing element 7 is defined by a rigid substantially horizontal annular structure which may either be central, i.e. surrounding the internal tube 5, or peripheral, i.e. in contact with the internal wall of the external tube 6. A plurality of flexible substantially radial rods is attached to this rigid annular structure so as to cover the whole section of the annular zone 4.

When the device is fully deployed, each slowing element 7 occupies the whole of the annular section 4, the vertical distance separating two consecutive slowing elements being in the range 50 cm to 150 cm.

In the basic version, the annular space 4 of each bayonet tube forms a continuous space and only in its upper portion does it have an obstacle constituted by the internal tube 5 passing through the external tube 6. This obstacle poses a problem when deploying the device of the invention and may be overcome by opening the rigid circular structure, for example over a half-circumference, so as to be able to be engaged around the internal tube 5, then closing said rigid structure using a clamping system 11, the clamping system itself being provided with substantially radial flexible rods.

In the version in which the internal tube 5 is kept centred by a centring device 12, the rigid structure of the slowing elements may be opened by being divided into two or 3 parts, then re-closed using any fixing means when the obstacle has been passed.

In the case in which the internal diameter of the external tube 6 has variations defining portions of the external tube 6 with a decreasing diameter from the top to the bottom of the bayonet tube, the solution provided depends on the type of rigid structure:
  If the structure of the slowing elements 7 is rigid about the internal tube 5, known as the rigid "central" structure, adjustment to the various diameters of the external tube 6 is accomplished by means of the flexibility of the flexible rods the length of which has been calculated to be able to reach the wall of the external tube 6 with the greatest diameter.
  If the structure of the slowing elements 7 is rigid at the periphery, the system of slowing elements 7 is adapted such that the rigid structure of the first element (counting the elements from bottom to top) corresponds to the smallest diameter, and the rigid structure of the subsequent elements are the same with respect to the dimension of the annular zone occupied by them when the device is entirely deployed. In this manner, a staged device in which the various slowing elements 7 have rigid structures with a diameter increasing from bottom to top is produced.

When a device is being put into position, a ballast may be added to the first slowing element to facilitate its deployment into the portion of the annular zone 4 with the smallest diameter.

In a variation of the filling device of the invention, in order to facilitate the descent of the device into the interior of the annular zone 4, the first slowing element 7 is equipped with a weight which can overcome the friction of the flexible rods on the wall of the external tube 6 in the case of a rigid central structure, or internal tube, 5, in the case of a rigid peripheral structure.

The present invention also concerns a method for loading catalyst using the device described above, which method can be broken down into the following series of steps:
  initially, the loading system has been wound into the external spooler 10, the feed hopper 1 being filled with solid;
  next, the loading system is gradually introduced into the annular zone 4 via its upper portion until the first slowing element 7 reaches a distance with respect to the bottom of the tube in the range 50 cm to 100 cm;
  the conveyor belt or the shaker conveyor 2 is started up so as to provide a flow rate of solid in the range 250 kg/h to 500 kg/h, the solid particles being introduced into the annular zone 4 via the funnel 3;
  as and when the tube is filled, the loading system is raised in the annular zone 4 with the aid of the external spooler 10 so as to keep a constant distance between the first slowing element 7 and the surface of the bed which is gradually being constituted, said distance being in the range 50 cm to 100 cm;
  the system is wound up at a speed equivalent to the speed of loading of the tube, in the range 0.2 metre/min to 0.4 metre/min;
  once the tube has been loaded and the loading system has been wound up, the system is displaced to load the next tube.

DETAILED DESCRIPTION OF THE INVENTION

The present invention can be defined as a device for the dense loading of catalyst into the annular space 4 of bayonet tubes, each bayonet tube having a height in the range 10 m to 20 m, a diameter of the external tube 6 in the range 250 mm to 150 mm, and an external diameter of the internal tube 5 in the range 10 to 40 mm.

The annular space 4 containing the catalyst thus has a characteristic width of approximately 50 mm. In practice, depending on the case, the characteristic width of the annular space 4 can vary between 30 mm and 80 mm.

In addition, in some cases, the external tube 6 has a diameter which decreases from top to bottom in sections, which means that the characteristic width of the annular space 4 also reduces from top to bottom. The device of the invention is designed to adapt itself to these variations in characteristic width and retain its performance over the whole series of sections.

One of the major problems posed by catalytic particles being loaded into tubes more than 15 metres in length is the risk of the catalytic particles to be loaded breaking if they are simply allowed to fall freely without taking any precautions; this is one of the solutions of the prior art for producing a dense loading, knowing that the risk of breakage generally arises above a drop height of 1 metre.

Other problems are linked to the geometry of the annular catalytic space, which prohibits the passage of conventional loading systems.

In a frequent case in the context of the present invention, an internal tube 5, which passes through the external tube 6 in the upper portion of the annular zone 4 to provide an outlet which is completely free of reaction effluents, has to be contended with.

The slowing elements 7 can be used to get round this obstacle when positioning the device by having a rigid structure which can be opened up into several parts, generally two, then closed up again after passing round the obstacle using any fixing means known to the skilled person.

This possibility of opening up the rigid structure of the slowing elements is also useful when getting round the obstacle constituted by the centring piece 12 when it is present. As indicated in the prior art, the risk of arching over is accentuated when the ratio between the diameter of the tube and the principal dimension of the particles is less than 8, which is often the case in the context of the present invention, since the typical width of the annular space (50 mm) equates to about 4 times the characteristic diameter of the particles of catalyst.

The device of the present invention considerably reduces the risk of arching over since the solid particles will be slowed down by passing through the flexible rods of the slowing elements and will be deposited gradually over the surface of the bed.

The fall height of the particles from the first slowing element (counted from bottom to top) to the surface of the catalytic bed which is being formed is at most 1 metre.

Finally, loading is carried out tube by tube (or in groups of two or three tubes supplied in parallel), and so it has to be sufficiently rapid for industrial use, because a steam reforming reactor aimed at a production of approximately 100000 Nm$^3$/h of H$_2$ generally includes 200 to 350 bayonet tubes.

The filling device of the invention consists of:
- a series of slowing elements 7 regularly vertically distributed along the annular space 4, occupying the whole section of said annular zone and connected together via vertical flexible connections and separated by a vertical distance in the range 50 cm to 150 cm;
- said slowing elements 7 being connected together via one or more chains 8 which are wound around a spooler 10 located outside the tube to be filled, and the particles of catalyst being contained in:
- a central feed hopper 1 which can be used to deliver the particles onto a conveyor belt 2 supplying the annular space 4, via:
- a funnel 3 via which the particles flow into the interior of the annular space 4.

The annular space 4 which is thus defined may be a single space or be divided into several substantially identical sectors by means of a system termed a "centring piece" 12. A sector is thus defined as a portion of the annular space which corresponds to a well-defined fraction of the annular section and extends over the entire height of said annular space.

Each slowing element 7 is in the shape of a rigid circular ring abutting either the internal tube 5 or the external tube 6, this ring being provided with a plurality of radial flexible rods which occupy the entire section of the annular zone 4.

In certain cases in which the slowing elements 7 also have to play a role of centring the internal tube 5 with respect to the external tube 6, the slowing elements 7 may be provided with rigid fins 9 disposed in a radial manner and extending over the whole width of the annular zone 4, as can be seen in FIG. 1b.

Figure 3:
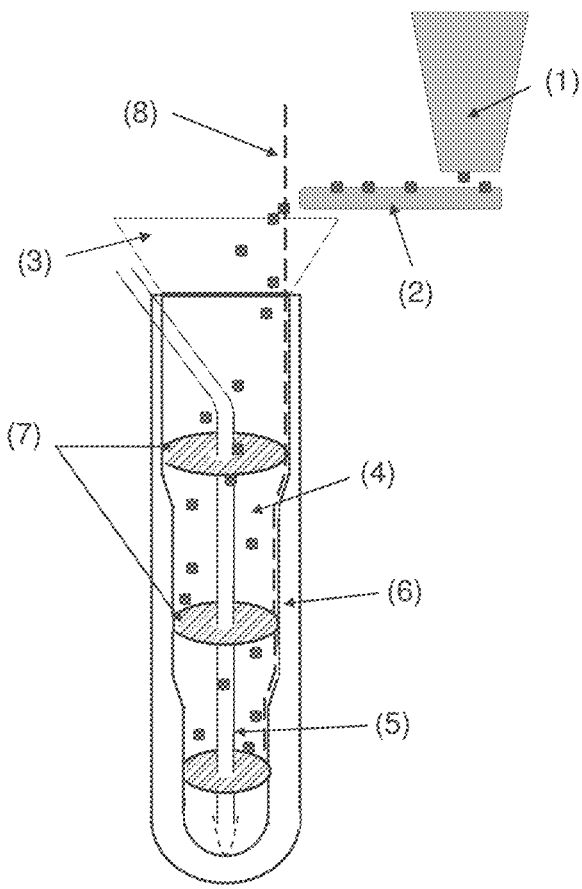
FIG. 3 represents a variation of the device of the invention in which the slowing elements have a rigid peripheral structure, i.e. abutting the external tube 6.

When the diameter of the wall of the annular space 4 varies because portions of the external tube 6 have an internal diameter which decreases from top to bottom, the solution to this variation depends on the type of rigid structure of the slowing elements:
- if the structure of the slowing elements 7 is rigid about the internal tube 5, a rigid structure which is termed "central", adjustment to the various diameters of the external tube 6 is accomplished by the flexibility of the flexible rods the length of which is calculated to be able to reach the wall of the external tube 6 with the largest diameter (see FIG. 1a);
- if the structure of the slowing elements 7 is rigid at the periphery, i.e. around the external tube 6, the system of slowing elements 7 is adapted so that the rigid structure of the first element (counting the elements from bottom to top) corresponds to the smallest diameter and the rigid structure of the subsequent elements corresponds to the dimension of the annular zone which they occupy when the device is completely deployed.
- This produces a staged device in which the various slowing elements 7 have rigid structures with a diameter which increases from bottom to top (see FIG. 3).

Figure 4:
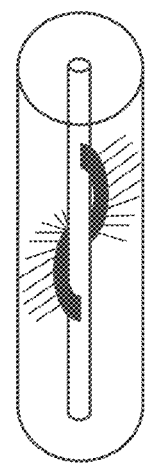
FIG. 4 represents another variation of the device of the invention, in which the slowing elements are part-helical in shape.

In a variation of the device of the invention, shown in FIG. 4, the slowing elements 7 have a rigid structure in the form of helical sections, the flexible rods being attached in a radial manner right along the helical section. The helical shape of the rigid structure allows it to very easily get past the obstacle constituted by the crossover of the internal tube 5 in the upper portion of the annular zone 4 or the crossover of the centring piece 12 allowing correct positioning of the internal tube 5.

In order to facilitate the descent of the device inside the annular zone 4, it is possible to equip the first slowing element 7 with a weight which can overcome the friction of the flexible rods on the wall of the external tube 6. The first slowing element 7 is that which is always placed closest to the surface of the catalytic bed which is being formed.

Concerning the method for loading using the device as described above, this can be described by the following steps:

initially, the loading system has been wound into the external spooler 10, the feed hopper 1 being filled with solid;

next, the loading system is gradually introduced into the annular zone 4 via its upper portion until the first slowing element 7 reaches a distance with respect to the bottom of the tube in the range 50 cm to 100 cm. This first element may be provided with a supplemental mass, suspended or fixed on this element, to facilitate the descent of the set of elements;

the conveyor belt or the shaker conveyor 2 is started up so as to provide a flow rate of solid in the range 250 kg/h to 500 kg/h;

as and when the tube is filled, the loading system is raised in the annular zone 4 with the aid of chains and the external spooler 10 so as to keep a constant distance between the first slowing element and the surface of the bed which is gradually being constituted. This distance is in the range 50 cm to 100 cm;

the system is wound up at a speed equivalent to the speed of loading of the tube, in the range 0.2 metre/min to 0.4 metre/min;

during loading, the feed hopper 1 may be filled again if its volume is smaller than that of the tube. This operation may be carried out with or without stopping loading;

once the tube has been loaded and the loading system has been wound up, the system is displaced in order to load the next tube.

Operations for verifying loading using measurements of the pressure drop between two points of the bayonet tube accompany the loading operation, but have not been described in this text as they are considered to be very familiar to the skilled person.

EXAMPLE OF THE INVENTION

Loading tests were carried out with the device of the invention constituted by two slowing elements 7 disposed in an experimental 1 m high column constituted by an internal tube 5 with an external diameter of 42 mm and an external tube 6 with an internal diameter of 128.1 mm.

The solid particles to be loaded were in the shape of small cylinders with a height of 1.5 cm and a diameter of 0.8 cm.

A slowing element 7 has a rigid circular structure in the shape of a spiral with an internal diameter of 45 mm onto which a plurality of substantially radial flexible rods had been attached.

The distance between the first slowing element 7 and the surface of the bed being formed was kept equal to 50 mm during loading.

The device was continuously lifted at a speed of 0.3 metre/min.

Once the bed had been loaded, the ΔP was measured with a flow of air of 130 Nm$^3$/h.

After unloading, the broken particles were isolated from the batch. The amount of breakage was very small, of the order of 0.1%.

The results of loading are shown in Table 1 below.

The loading obtained with this system was highly satisfactory, with an excellent reproducibility in terms of pressure drop (standard deviation of ±1.4%).

The loading time was a maximum of 3.3 minutes /metre, which corresponded to a time of approximately 40 minutes for a 12 m tube (for a solid flow rate of approximately 320 kg/h).

The loading density was 1009 kg/m$^3$, reproducible across all of the loads.

TABLE 1

Results of loading with the device with slowing elements over a 1 m model.

| Loading time (min) | Unloading time (min) | Height of solid (cm) | Density of loading (kg/m$^3$) | Pressure drop (mm H$_2$O) | Standard deviation | Amount of breakage |
|---|---|---|---|---|---|---|
| 3'00" | 9' | 94 | 1009 | 280 | −1.4% | 0.1% |
| 2'42" | 10' | 94 | 1009 | 288 | 1.4% | 0.07% |
| 2'47" | — | 94 | 1009 | 284 | 0 | — |

Mean pressure drop 284

The invention claimed is:

1. A device for densely filling catalyst specially adapted to a steam reforming exchanger-reactor comprising a plurality of bayonet tubes enclosed in a shell, the catalyst being constituted by solid particles occupying at least part of an annular space (4) included between an internal tube (5) and an external tube (6), the assembly of these two tubes constituting a bayonet tube, the width of said annular space being in the range 30 mm to 80 mm, and its height being in the range 10 to 20 meters, the catalyst particles being in the form of cylinders with an approximate height of 10 mm to 20 mm and an approximate diameter of 10 mm to 20 mm, the device comprising:

a series of slowing elements (7) which are annular in shape, the internal diameter of the slowing elements being substantially equal to that of the internal tube (5) and the external diameter of the slowing elements being substantially equal to that of the internal diameter of the external tube (6), said series of slowing elements (7), when deployed, being distributed vertically in a regular manner along the annular space (4) and each occupying the whole section of the annular zone (4), connected together via vertical flexible connections and separated by a vertical distance in the range of 50 cm to 150 cm, each slowing element being constituted by a rigid annular structure onto which a plurality of substantially radial flexible rods are attached and occupying the whole section of the annular space (4), said slowing elements (7) being connected together via one or more vertical flexible connections (8) which are capable of being wound around a spooler (10) located outside the annular space (4) to be filled so that the slowing elements can be deployed in and removed from the annular space (4), and the particles of catalyst being contained in:

a central feed hopper (1) which is capable of delivering the particles onto a conveyor belt or shaker conveyor (2) supplying the annular space (4) via:

a funnel (3) via which the particles flow into the interior of the annular space (4).

2. The filling device according to claim 1, in which each slowing element (7) is additionally provided with rigid fins (9) disposed in a radial manner and extending over the whole width of the annular space (4).

3. The filling device according to claim 1, in which each slowing element (7) has a rigid structure with a helical shape around the internal tube (5) to which the plurality of substantially radial flexible rods occupying the whole section of the annular space (4) are attached.

4. The filling device according to claim 1, wherein the radial dimension of the annular space (4) varies because portions of the external tube (6) have an increasing internal diameter from bottom to top, and the slowing elements (7) have a rigid peripheral structure and have increasing diameters from bottom to top so as to occupy the whole horizontal section of the portion of the annular space (4) in which they are located when deployed in the annular space (4).

5. The filling device according to claim 1 which, in order to facilitate the descent of the device into the annular space (4) when being deployed, has a first slowing element (7), which first enters the annular space when being deployed, equipped with a weight which can overcome the friction of the flexible rods on the wall of the external tube (6) in the case of a rigid central structure, or on the wall of the internal tube (5) in the case of a rigid peripheral structure.

6. A method for loading solid particles of catalyst using the device according to claim 1, comprising:
   initially, having the loading system being wound onto the spooler (10), and the feed hopper (1) being filled with the solid particles;
   next, introducing the device into the annular space (4) via its upper portion until the first slowing element (7) reaches a distance with respect to the bottom of the annular space (4) in the range 50 cm to 100 cm;
   starting the conveyor belt or the shaker conveyor (2) so as to provide a flow rate of solid particles in the range 250 kg/h to 500 kg/h, the solid particles being introduced into the annular space (4) via the funnel (3);
   when the annular space (4) is filled, raising the device from the annular space (4) with the aid of the spooler (10) so as to keep a constant distance between the first slowing element and the surface of the bed of solid particles which is gradually being constituted, said distance being in the range of 50 cm to 100 cm;
   the device being raised up and wound onto the spooler at a speed equivalent to the speed of loading of the annular space (4), in the range 0.2 meter/min to 0.4 meter/min; and
   once the annular space (4) has been loaded and the device has been wound up on the spooler, the device is displaced in order to load another annular space.

7. The filling device according to claim 1, wherein the rigid annular structure is a central structure having a diameter substantially equal to that of the internal tube (5) onto which a plurality of substantially radially outward flexible rods are attached.

8. The filling device according to claim 1, wherein the rigid annular structure is a peripheral structure having a diameter substantially equal to that of the internal diameter of the external tube (6) onto which a plurality of substantially radially inward flexible rods are attached.

9. The filling device according to claim 1, wherein the vertical flexible connections (8) are chains.

* * * * *